United States Patent [19]

Tamura et al.

[11] Patent Number: 5,650,803
[45] Date of Patent: Jul. 22, 1997

[54] INK-JET RECORDING METHOD AND INK-JET RECORDING APPARATUS

[75] Inventors: Yasuyuki Tamura, Yokohama; Makoto Shioya, Tokyo, both of Japan

[73] Assignee: Canon Kabushiki Kaisha, Tokyo, Japan

[21] Appl. No.: 894,653

[22] Filed: Jun. 5, 1992

[30] Foreign Application Priority Data

Jun. 7, 1991 [JP] Japan ................................. 3-136574
Jun. 7, 1991 [JP] Japan ................................. 3-136609

[51] Int. Cl.⁶ ........................................................ B41J 2/205
[52] U.S. Cl. ........................................ 347/15; 347/41; 358/298
[58] Field of Search ................................ 346/75, 140 R,
346/1.1; 400/70; 347/15, 37, 12, 40, 41,
43, 131, 183, 240, 251; 358/298

[56] References Cited

U.S. PATENT DOCUMENTS

| | | | |
|---|---|---|---|
| 4,219,822 | 8/1980 | Paranjpe | 346/75 |
| 4,312,005 | 1/1982 | Iwasaki . | |
| 4,313,124 | 1/1982 | Hara . | |
| 4,345,262 | 8/1982 | Shirato et al. . | |
| 4,401,991 | 8/1983 | Martin . | |
| 4,459,600 | 7/1984 | Sato et al. . | |
| 4,463,359 | 7/1984 | Ayata et al. . | |
| 4,558,333 | 12/1985 | Sugitani et al. . | |
| 4,567,570 | 1/1986 | Peer | 400/70 |
| 4,723,129 | 2/1988 | Endo et al. . | |
| 4,740,796 | 4/1988 | Endo et al. . | |
| 4,809,016 | 2/1989 | Padalino | 346/75 |
| 4,987,429 | 1/1991 | Finley et al. | 346/1.1 |
| 5,059,984 | 10/1991 | Moore et al. | 346/140 R |
| 5,430,469 | 7/1995 | Shioya et al. | 347/15 |

FOREIGN PATENT DOCUMENTS

| | | |
|---|---|---|
| 0104285 | 4/1984 | European Pat. Off. . |
| 0308272 | 3/1989 | European Pat. Off. . |
| 0376596 | 7/1990 | European Pat. Off. . |
| 54-056847 | 5/1979 | Japan . |
| 59-123670 | 7/1984 | Japan . |
| 59-138461 | 8/1984 | Japan . |
| 60-027548 | 2/1985 | Japan . |
| 60-071260 | 4/1985 | Japan . |

*Primary Examiner*—John E. Barlow, Jr.
*Attorney, Agent, or Firm*—Fitzpatrick, Cella, Harper & Scinto

[57] ABSTRACT

A line of ink nozzles in an ink-jet recording head is inclined obliquely from a scanning line, and one pixel is formed by a plurality of ink droplets discharged from different ink nozzles. Thus, a high halftone recording image without stripes (banding) due to a variation of a discharged ink volume or unevenness of recording image density, can be obtained. Moreover, since there is a large degree of freedom in designing an amount of the discharged ink volume, high packing density of ink nozzles can be easily achieved.

12 Claims, 12 Drawing Sheets

MAIN-SCANNING LINE
THE NUMBER OF DROPLETS LANDING ON PAPER
b+1
NOZZLE NUMBER
FIG. 4A  ONE
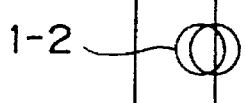
1-1
FIG. 4B  TWO
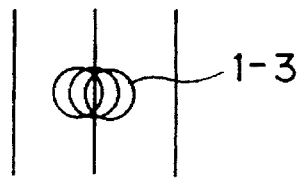
1-2
FIG. 4C  THREE
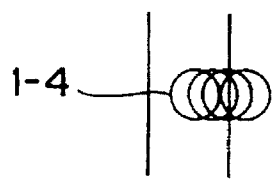
1-3
FIG. 4D  FOUR
1-4
FIG. 4E  FIVE
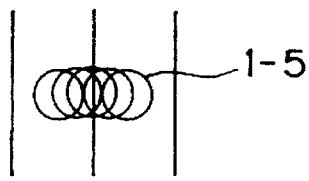
1-5

INK-JET RECORDING METHOD AND INK-JET RECORDING APPARATUS

BACKGROUND OF THE INVENTION

Field of the Invention

The present invention relates to an ink-jet recording method and an ink-jet recording apparatus, and particularly to an ink-jet recording method and apparatus for forming halftone (gray scale) recording images by using a recording head having a plurality of ink discharge orifices.

Description of the Related Art

An ink-jet recording method makes image information visible on a recording medium (recording paper) by discharging ink from ink discharge orifices (called nozzles below) in response to a recording signal. Generally speaking, this recording is carried out by discharging ink from a number of nozzles integrally formed in a recording head so as to achieve high speed recording. In this case, the linear arrangement in which a number of nozzles are disposed in line makes it possible to fabricate a head with ease because a processing technique becomes simpler, and to arrange a large number of nozzles with high packing density.

In particular, respective sets of nozzles each of which discharges one of the yellow, magenta, and cyan ink (and black if needed) are used for recording color images.

To picture halftone recording images by the ink-jet recording method, a technique that changes the volume of ink droplets can be employed. This technique, however, has not yet been established, and a method of controlling the number of dots discharged per unit area by a known image processing technique is commonly used. In another method, a plurality of small ink droplets are discharged to about the same location, and the number of discharged droplets are controlled so as to achieve a tone wedge of a recording image. By this method, halftoning can be accomplished without reducing the resolution.

Although increasing the number of nozzles is effective for high speed recording, a large number of nozzles will record images a wide area at a time, resulting in unevenness of image density due to the slight difference in discharge characteristics of each nozzle.

According to an experiment of the inventors of the present invention, only a few percent change in the ink discharge volume resulted in recognizable unevenness, and a serious problem occurs in recording halftone recording images.

In particular, in the method wherein a number of ink droplets are discharged on each approximately identical locations on recording paper so as to control the tone wedge of a recording image, increasing number of nozzles is essential. This is because a great number of ink droplets must be discharged to record images on a sheet of recording paper, but increasing a driving frequency of the nozzles has its upper limit. In such a case, it is difficult to prevent unevenness of image density.

In addition, in the method wherein a number of ink droplets are discharged on each approximately identical locations on recording paper, each ink droplet must be small in volume. This makes the spread of ink on a recording medium small even if a number of ink droplets are discharged, which will cause gaps between adjacent recording pixels owing to slight errors of discharge positions, thus resulting in stripe-like spreads (banding) in a recording image sometimes.

To prevent such stripe-like spreads, it is preferable that a plurality of ink droplets are discharged in the vertical or horizontal direction to form one pixel. Such control, however, is difficult in the conventional ink-jet recording method.

SUMMARY OF THE INVENTION

It is an object of the present invention to solve the above described problems.

It is another object of the present invention that unevenness of image density owing to the difference in discharging characteristics of each nozzle, is suppressed by using a plurality of nozzles for picturing one pixel so as to achieve a high halftone (gray scale) recording image and high quality.

It is further another object of the present invention that nozzle packing density for each pixel is made high without making a nozzle pitch of the recording head smaller and the resolution lower than are required.

It is still another object of the present invention to enhance the degree of freedom of an amount of discharged ink per nozzle in manufacturing.

In a first aspect of the present invention, an ink-jet recording apparatus which records a halftone recording image by landing more than one ink droplet on one pixel comprises:

a recording head being arranged with N discharging portions; and scanning means for scanning the recording head and a recording medium relative to each other in a direction of a line of the discharging portions and a direction different from a direction perpendicular to the direction, wherein a relationship between the direction of the line of discharging portions and the scanning direction is determined so that the N discharging portions correspond to L scanning lines (L<N) and each continuous M (=N/L) discharging portions generate one pixel;

further comprising control means for controlling a drive of the recording head so that ink droplets can be discharged on one pixel from a maximum of M discharging portions in the scanning process.

When a pitch of the neighboring scanning lines is A, A×L may be made to be equal to or less than 0.5 mm or L may be made to be equal to or less than 8.

When an angle between the direction of the line of discharging portions and the scanning direction, is $\theta$, $\tan \theta$ may be about 1/M.

The control means may control a drive timing of the recording head so that the one pixel is formed by a line of a maximum M of ink droplets in a direction perpendicular to the scanning direction.

The recording head may comprise heating elements each of which produces thermal energy for discharging ink in response to an electric current.

In a second aspect of the present invention, an ink-jet recording method in which a halftone recording image is recorded by landing more than one ink droplet for one pixel by using an ink-jet recording head arranged with N ink discharging portions comprises the steps of:

scanning relatively the recording head and a recording medium in a direction of a line of the discharging portions and a direction different from a direction perpendicular to the direction, so that the N discharging portions correspond to L scanning lines (L<M) and one pixel is formed by each continuous M (M=N/L) discharging portions; and controlling the ink-jet recording head at the scanning step so that a maximum M of ink droplets can be discharged for one pixel from a maximum of M discharging portions.

When a pitch of neighboring scanning lines is A, A×L may be made to be equal to or less than 0.5 mm or L may be made to be equal to or less than 8.

An angle between the direction of the line of discharging portions and the scanning direction, is $\theta$, tan $\theta$ may be about 1/M.

The control step may comprise a control step for controlling a drive timing of the recording head so that the one pixel is formed by a line of a maximum M of ink droplets in a direction perpendicular to the scanning direction.

The recording head may comprise heating elements each of which produces thermal energy for discharging ink in response to an electric current.

An ink-jet recording method may further comprise the step of determining a rule for whether each discharging portion of the M discharging portions is used or not for each halftone level, landing a maximum of K ink droplets for one pixel, and uniforming use frequency of each discharging portion to represent K+1 halftone levels. Here, K may equal to M.

According to the present invention, an area covered by a plurality of ink discharge orifices or nozzles (N) has a width of a predetermined number (L: L<N) of scanning lines by inclining a direction of ink nozzle line of the recording head to a scanning direction. Moreover, since ink droplets are discharged on the same pixel from various ink nozzles in a scanning process, stripes on a recording image can not be conspicuous even if characteristics of each ink nozzle fluctuate.

Moreover, even though the recording head with N ink nozzles provided are used to record images, the width for each recording is L scanning lines. Consequently, even if unevenness of image density occurs due to the fluctuation of characteristics of each ink nozzle, stripes on a recording image cannot be conspicuous. The reason is that an area of the narrow recording width of L scanning lines is recorded repeatedly from a visual point of the whole recording images on a recording medium.

According to the inventors' study, it is clear that the greater is the recording width, the more conspicuous is unevenness of a recording image. For instance, it is assumed that an image made of about 16 pixels per 1 mm (16 pel) recording width is seen from a distance of distinct vision. In this case, when the recording width is about 8mm, some percent unevenness of image density can be seen as a stripe. To the contrary, when the width is less than about 1 mm, fluctuation of image density of up to some tens of percent cannot be seen as a stripe from a visual point.

According to the present invention, since the recording width to be recorded at a time is as small as L scanning lines, unevenness of image density caused by unevenness of ink nozzles is not large and becomes allowable. Moreover, the recording speed does not slow down in spite of the small recording width to be recorded at a time.

Moreover, according to the present invention, some ink nozzles are used for recording one pixel. Even if characteristics of each nozzle vary, the variation is averaged, so that the unevenness is made small. This suppresses the unevenness of image density.

BRIEF DESCRIPTION OF THE DRAWINGS

FIGS. 4A–4E are views showing the states in which a plurality of ink droplets land on one pixel;

DETAILED DESCRIPTION OF THE PREFERRED EMBODIMENTS

Embodiments of the present invention will be described in detail below.

(Embodiment 1)

Figure 1:
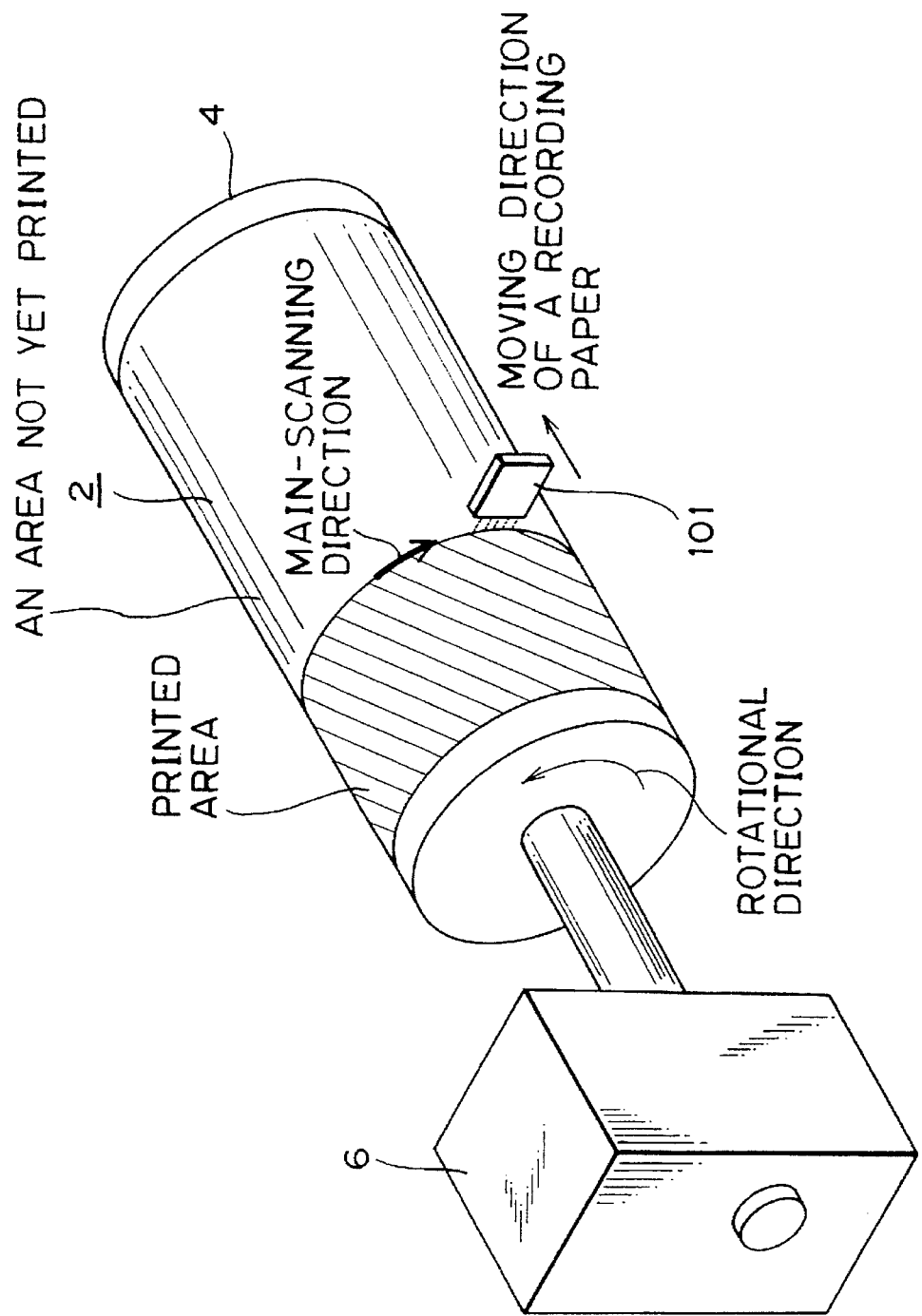
FIG. 1 is a schematic view showing an appearance of an embodiment of an ink-jet recording apparatus according to the present invention.

FIG. 1 is a schematic view showing an appearance of an embodiment of an ink-jet recording apparatus according to the present invention.

In this embodiment, recording paper 2 as a recording medium is wound on a drum 4 which is driven by a driving device 6. A recording head 101 is disposed over the recording paper 2 in such a manner that a nozzle line of the head 101 is inclined at a slight angle to the main-scanning direction (that is, not parallel to the main-scanning direction) which is defined by a rotation of the recording paper 2.

To record full-color images, three heads (for yellow, magenta, and cyan) or four heads (another head is added for black) are used so as to discharge ink of respective colors therefrom (not shown).

After the drum 4 has made one revolution and a first main-scanning has finished, the recording head 101 is moved or sub-scanned from left to right along the sub-scanning direction by a motor 209 (not shown in FIG. 1 and see FIG. 2) via a transmission mechanism and performs recording in the next mains-canning position.

Figure 2:
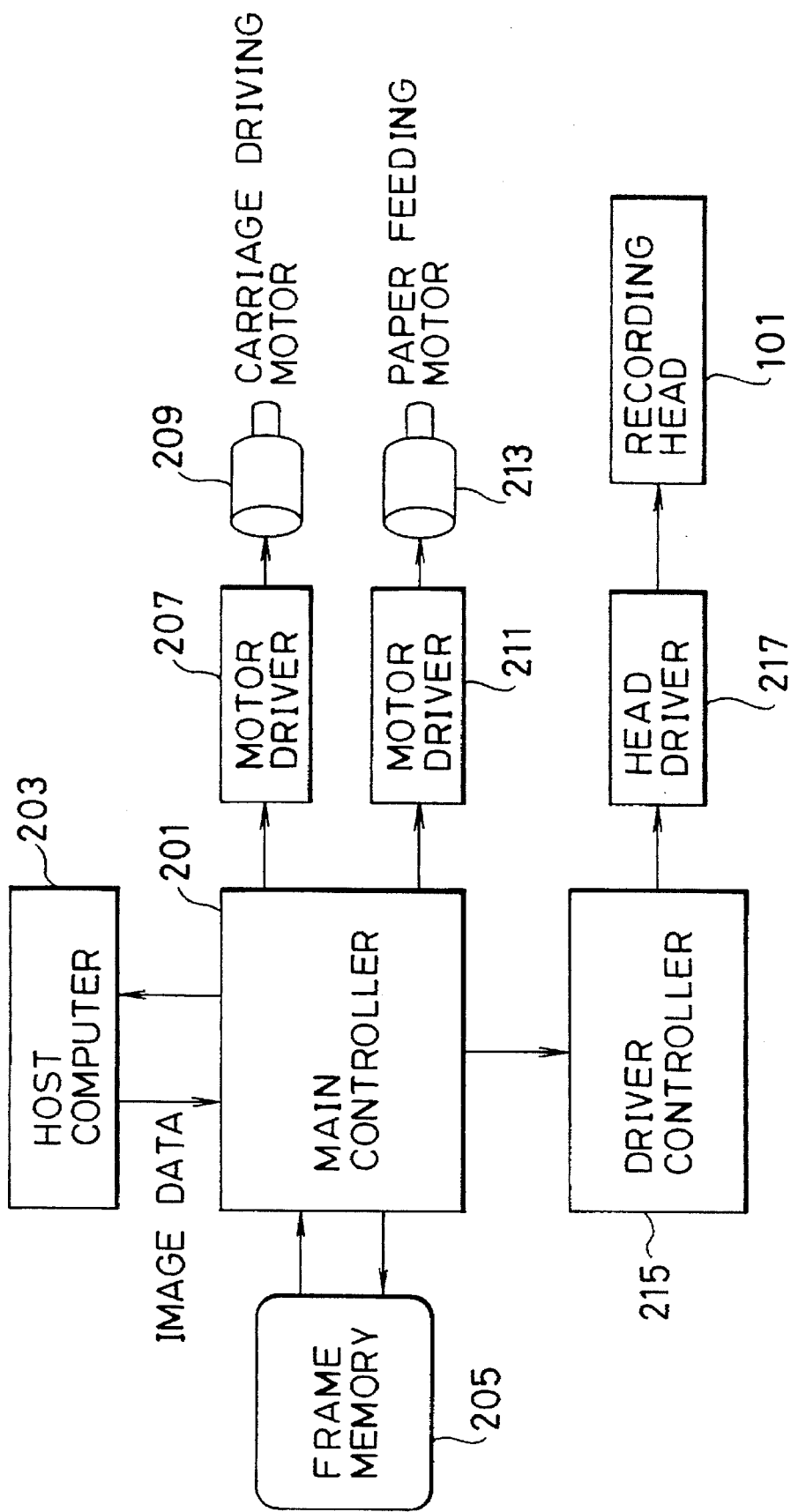
FIG. 2 is a block diagram showing a control system of the embodiment shown in FIG. 1 according to the present invention.

FIG. 2 shows a schematic arrangement of a control system of the embodiment shown in FIG. 1. In this figure, a main controller 201 performs control of the entire apparatus, such as a discharging timing. As the main controller 201, a one-chip microprocessor is used, which is incorporated with a CPU (central processing unit), a ROM (read-only memory) for storing programs, and a RAM (random-access memory) for providing a work area. The main controller 201 receives a halftone data signal from a host computer 203, and stores it frame by frame into a frame memory 205 functioning as a buffer memory. In an image recording mode (wherein ink is discharged), the main controller 201 controls a carriage driving motor 209 of a carriage with a recording head 101 mounted, via a first motor driver 207, so as to control movement of the recording head 101 in a sub-scanning direction. Moreover, the main controller 201 controls a paper feeding motor 213 via a second motor driver 211 so as to rotate the drum 4, and causes the recording head 101 to discharge ink via a driver controller 215 and a head driver 217 on a basis of halftone data read out of the frame memory 205 (explained below for details), recording a halftone (gray scale) recording image on the recording paper 2.

Figure 3:
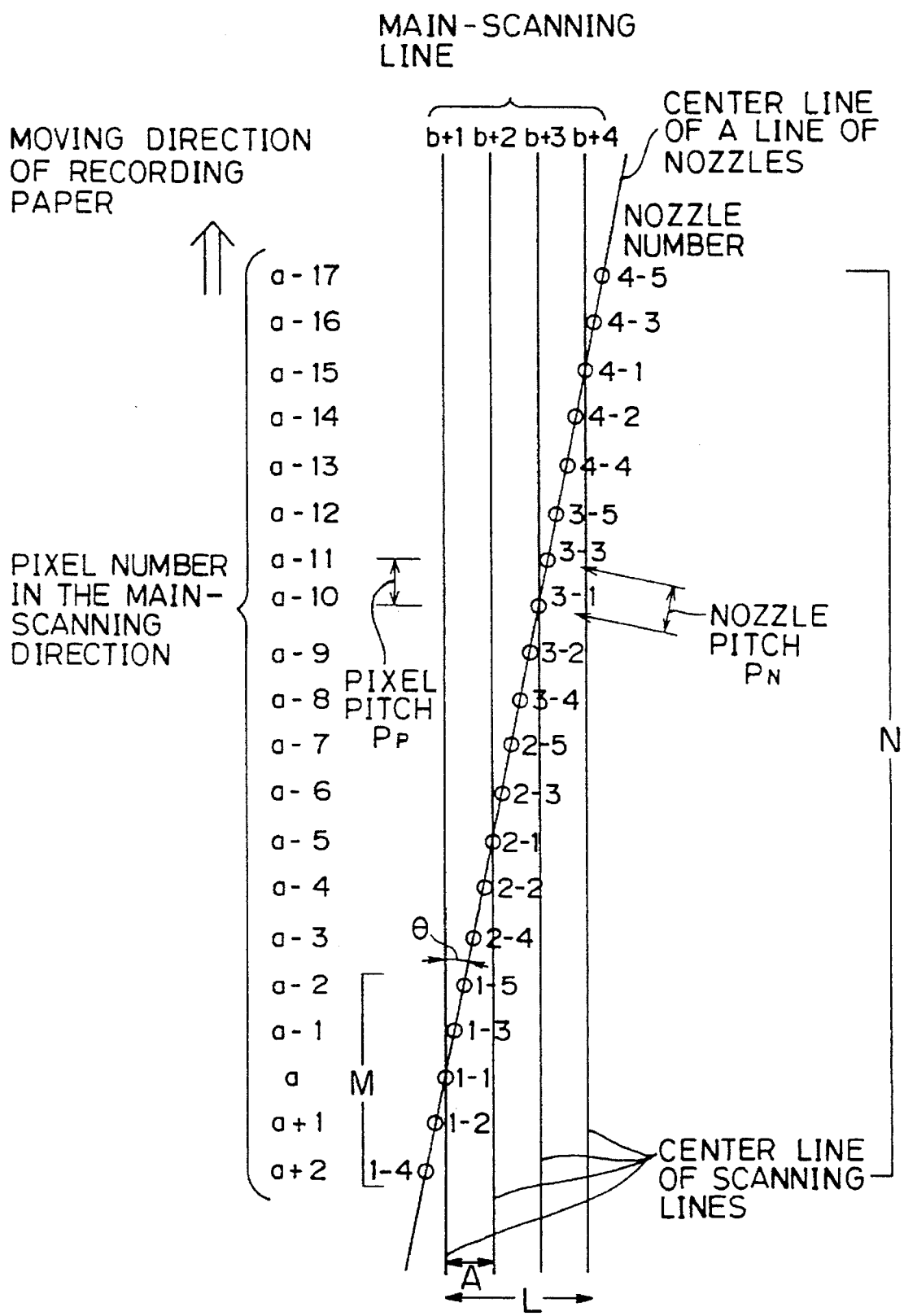
FIG. 3 is a view showing a positional relationship between a sheet of recording paper as a recording medium and a recording head having a plurality of ink nozzles.
Figure 5:
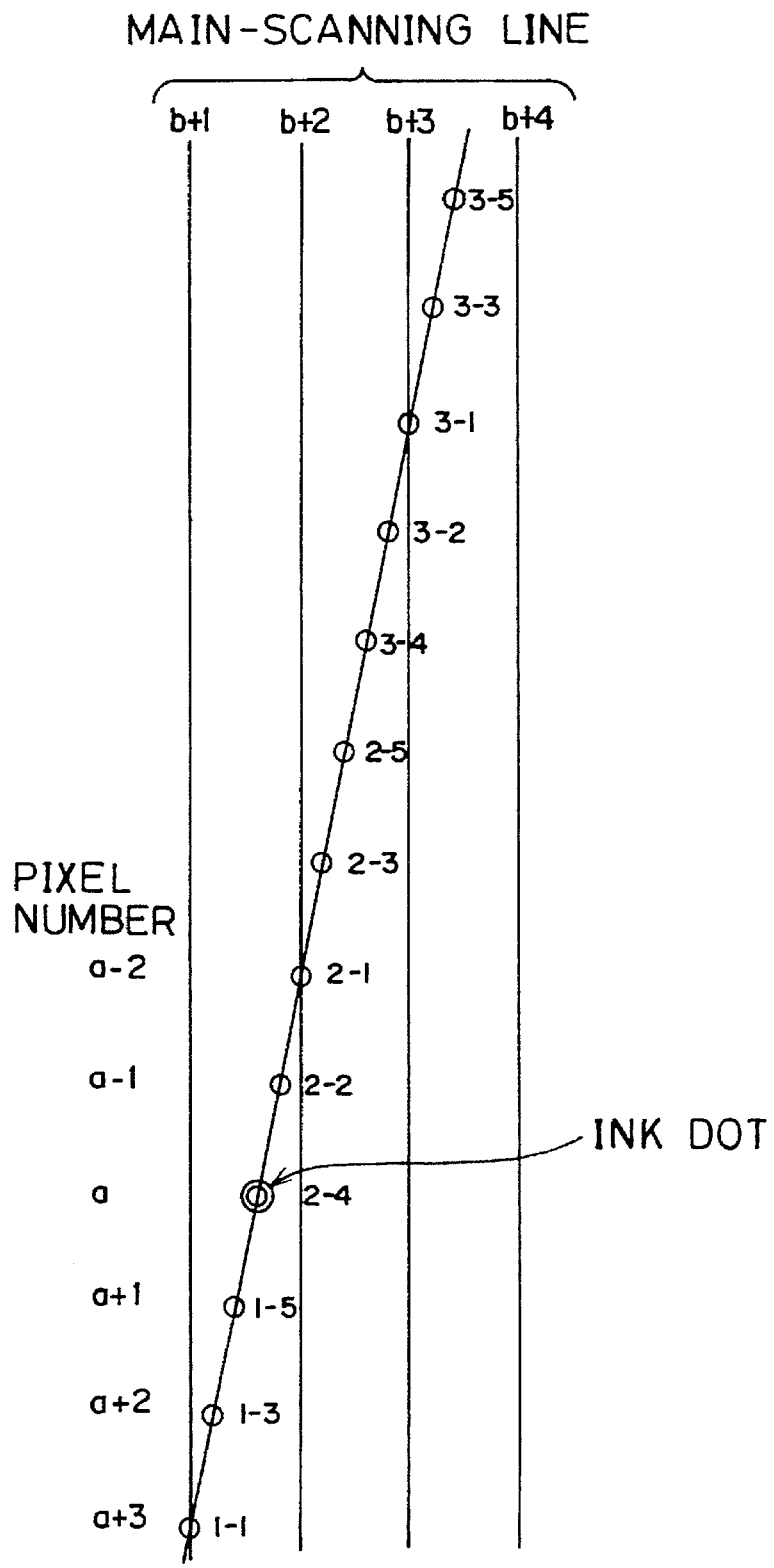
FIGS. 5 to 11 are diagrams showing processes of specific ink discharge control.
Figure 6:
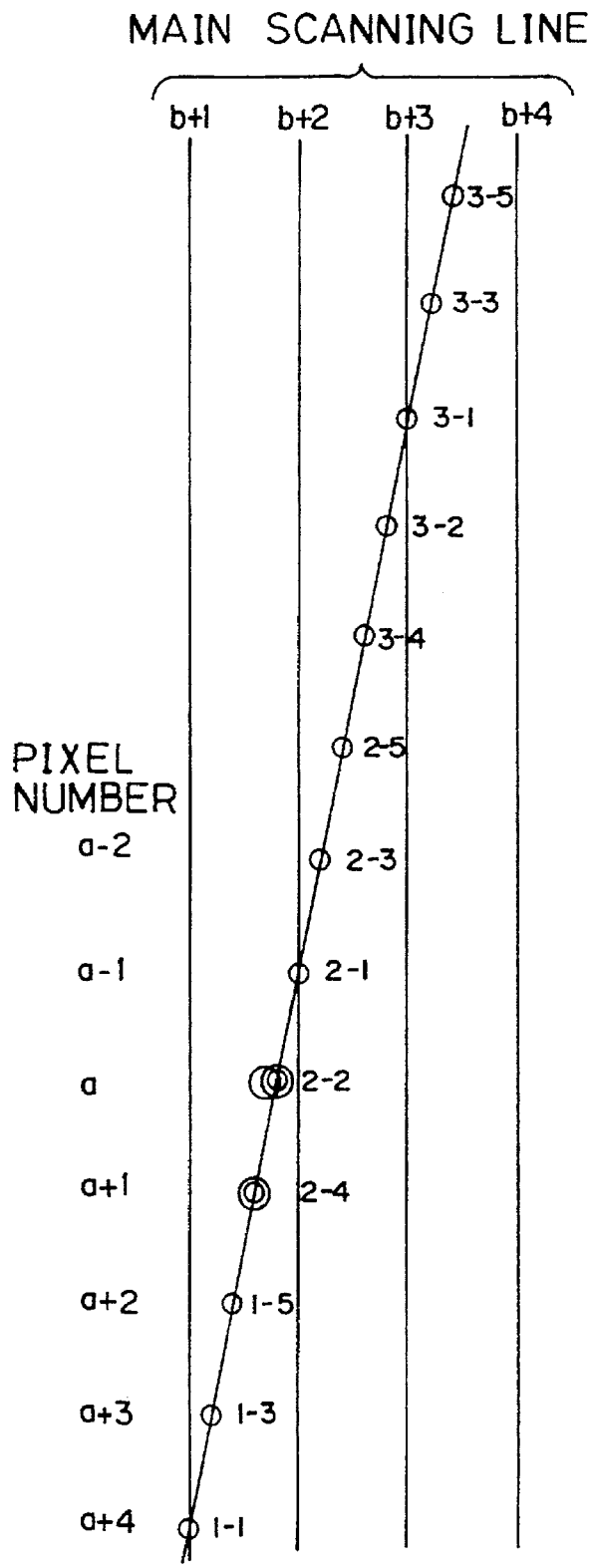
Figure 7:
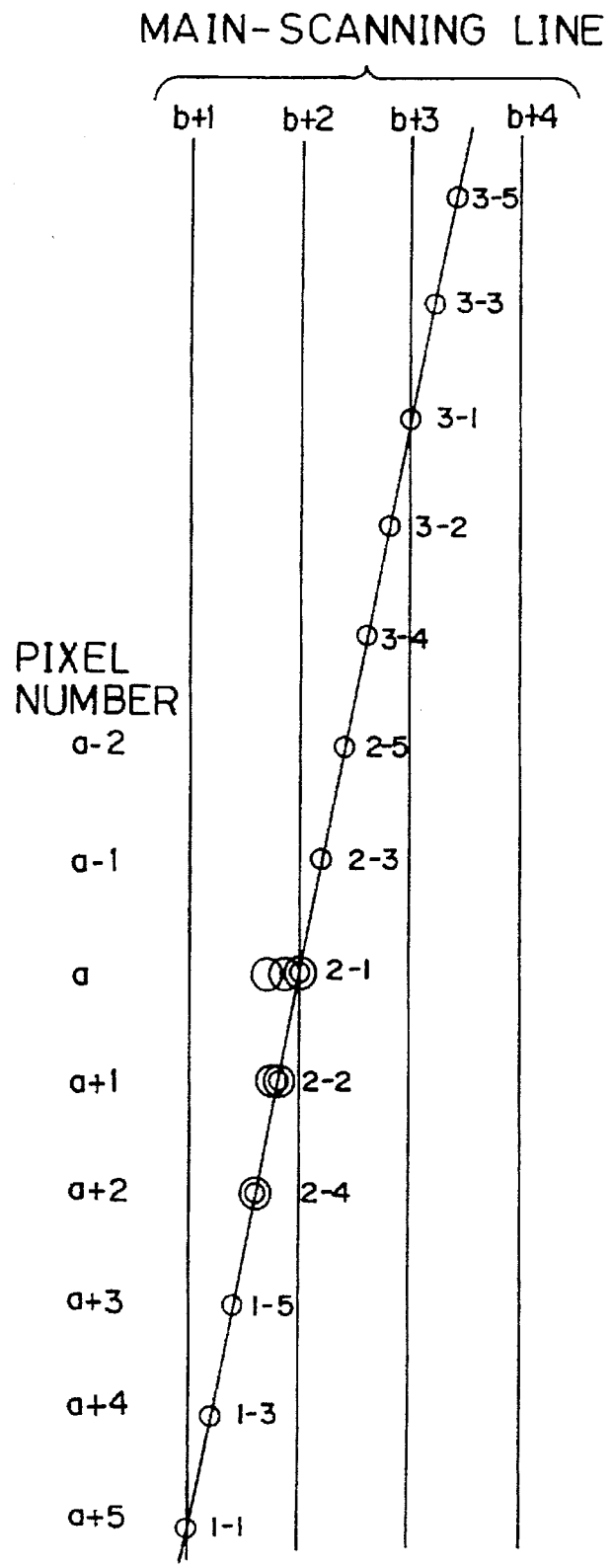
Figure 8:
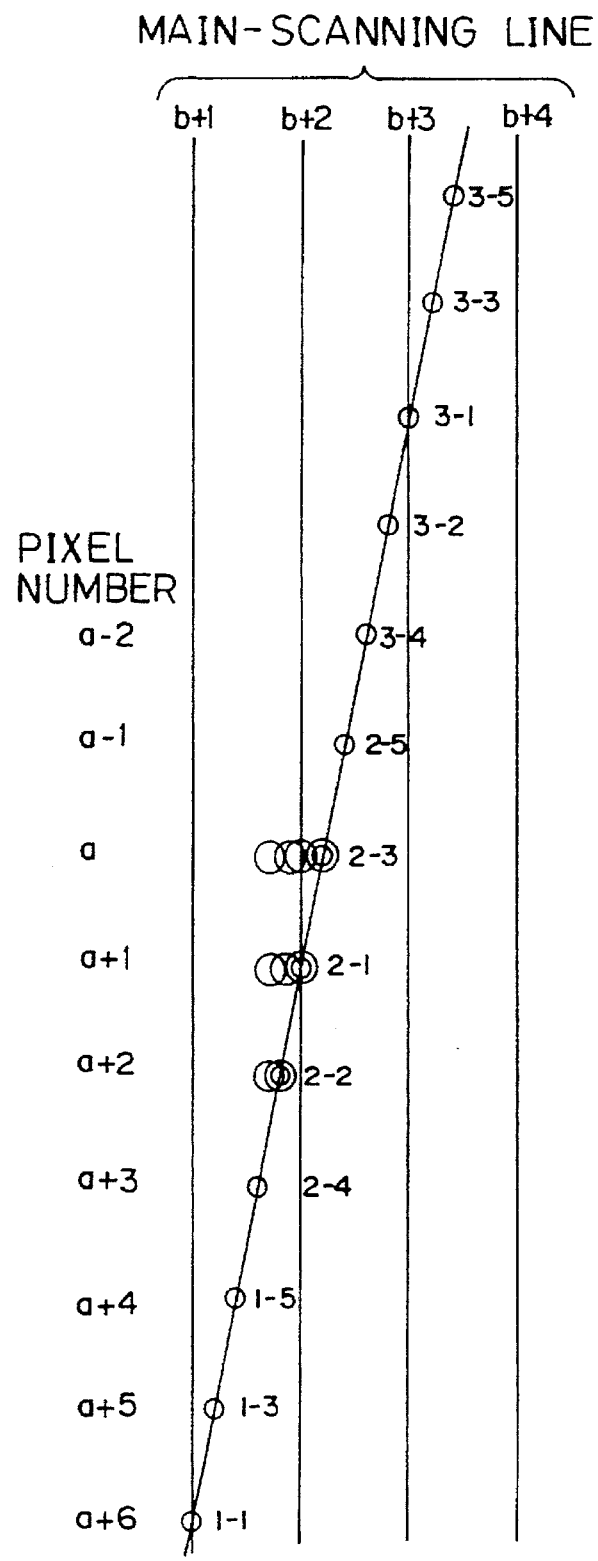
Figure 9:
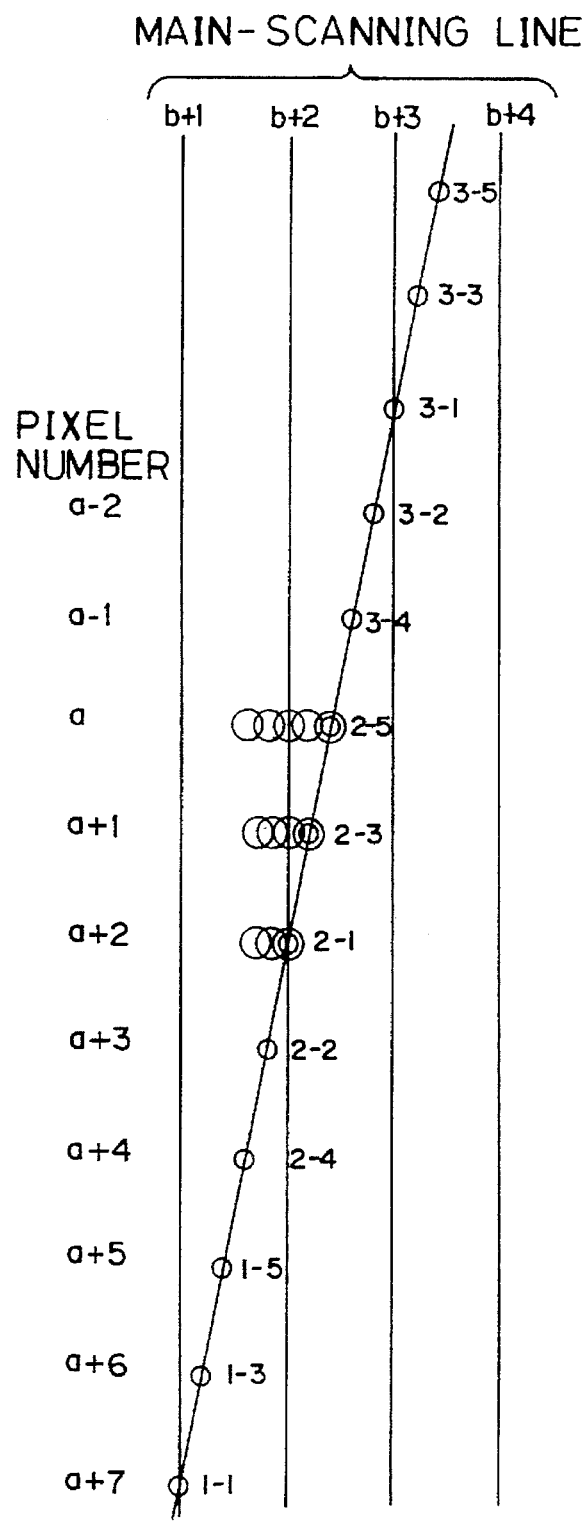
Figure 10:
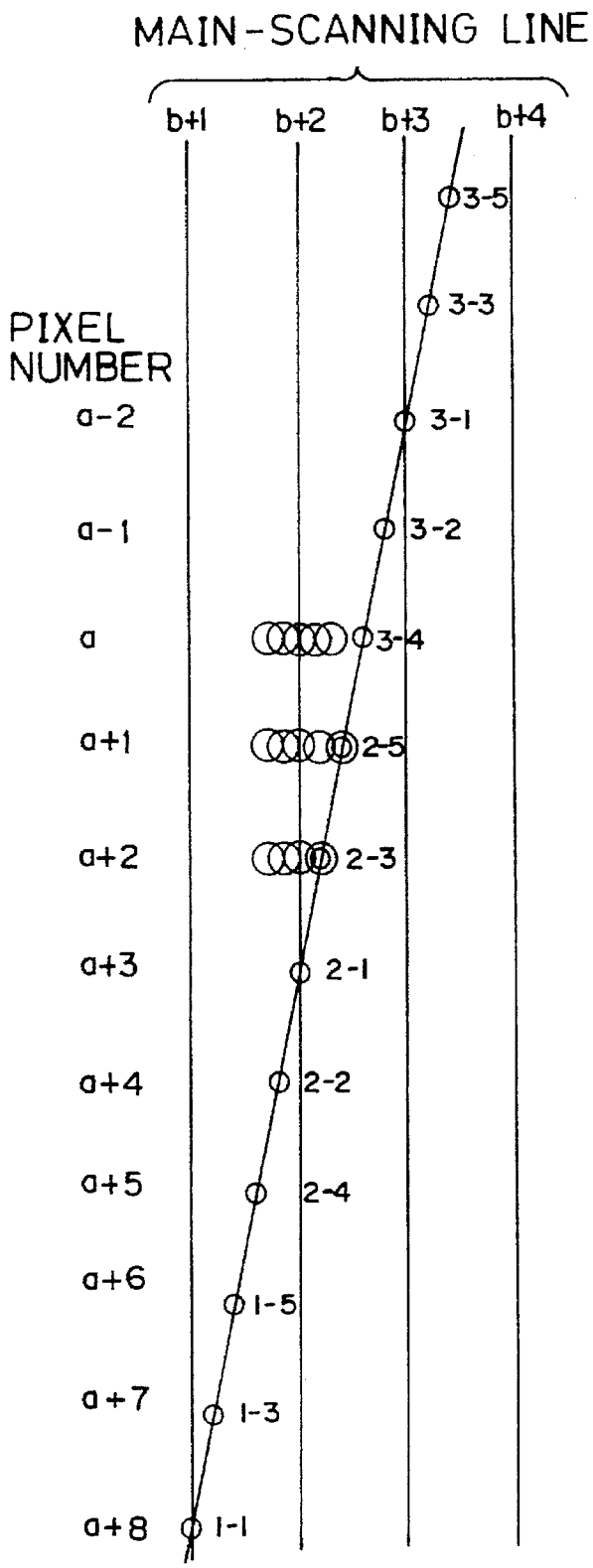

FIG. 3 illustrates a positional relationship of the recording paper 2 and the nozzle line formed in the recording head 101. In this figure, characters a–17–a+2 on the left side denote pixel numbers along the main-scanning direction on the recording paper. Vertical lines b+1–b+4 indicate main-scanning lines formed by the rotation of the drum 4.

The recording head 101 of the embodiment has 20 (=N) nozzles which make ink droplets land (deposit) on the four (=L) scanning lines (more exactly, on the lines and their surroundings) during one rotation of the drum 4. In other words, the 20 nozzles lined in the recording head 101 are disposed in such a manner that the direction of the nozzle line is inclined obliquely from the main-scanning direction, and the ink landing region (landing position) covered by the ink discharge from the nozzles is located on and around the four main-scanning lines. Therefore, the number of nozzles regarding forming of one pixel, is M=N/L=5. If an angle of the direction of the line to the main-scanning direction is $\theta$ and a pixel pitch in the main-scanning direction Pp is equal to a scanning line pitch or a pixel pitch in the sub-scanning direction, $\tan \theta = 1/M = 1/5$. Accordingly, an actual nozzle pitch $P_N$ is longer than the pixel pitch $P_P$ by about 2% because the nozzle line (discharge nozzle arrangement) of the recording head is set to incline at a slight angle $\theta$ to the mains-canning line. Since the recording paper 2 is moved in the direction indicated by the arrow, by one pixel pitch $P_P$ for each repetitive cycle of discharge of one ink droplet from each nozzle of the head, the nozzle pitch in the main-scanning direction becomes equal to the pixel pitch $P_P$.

Incidentally, in embodiments described here and hereinafter of the present invention, term "discharging portion", "outlet" or "orifice" may be used instead of term "nozzle".

In one example, the repetitive cycle of discharge of one ink droplet from each nozzle of the recording head is 10 kHz, and the pixel density per 1 mm width is 16. In this case, the pixel pitch $P_P$ is 62.5 μm, the nozzle pitch $P_N$ is 63.7 μm, and the main-scanning speed of the recording paper is 0.625 m/sec.

In this embodiment, five ink droplets from five nozzles per pixel are discharged into a pixel for the most high density parts. Accordingly, the recording of six halftone levels or 5, 4, 3, 2, 1 and 0 ink droplets can be achieved.

The steps of the six halftone recording will be described below.

First, the explanation with regard to the nozzle numbers 1-1, 1-2, 1-3, 1-4 and 1-5 or the like in FIG. 3 is made. The character x in the nozzle number (x-y) indicates the main-scanning line: x=1 denotes the nozzle forming pixels on the main-scanning line b+1; x=2 denotes the nozzle forming pixels on the main-scanning line b+2; and so forth.

On the other hand, the character y in the nozzle number (x-y) indicates nozzles employed to discharge y ink droplets (y≦5, in this embodiment), and does not indicate the discharging sequence of the ink droplets. For example, to land three ink droplets on the pixel a-1 on the main-scanning line b+1, a first ink droplet is discharged from the nozzle 1-3, a second ink droplet is discharged from the nozzle 1-1 after the recording paper is moved by one pixel pitch in the arrow direction, and finally, a third ink droplet is discharged from the nozzle 1-2 after the recording paper is further moved by one pixel pitch in the arrow direction. Thus, the ink droplets land on the recording paper as shown in FIG. 4C.

Likewise, to discharge five ink droplets as shown in FIG. 4E, a first ink droplet is discharged from the nozzle 1-5, followed by the successive ink discharge from the nozzles 1-3, 1-1, 1-2, and 1-4 in this order every time the recording paper is moved.

Referring to FIGS. 5–11, other examples of ink discharge control will be described. In these figures, small circles indicate positions of the nozzles, large circles indicate the landing positions of ink droplets (dot or ink dots).

FIGS. 5–11 illustrate a discharge sequence when the highest density pattern (five ink droplet discharge per pixel) of one dot width and three dot length on the main-scanning line b+2 is formed for pixels a, a+1, a+2 on the main-scanning line.

Figure 11:
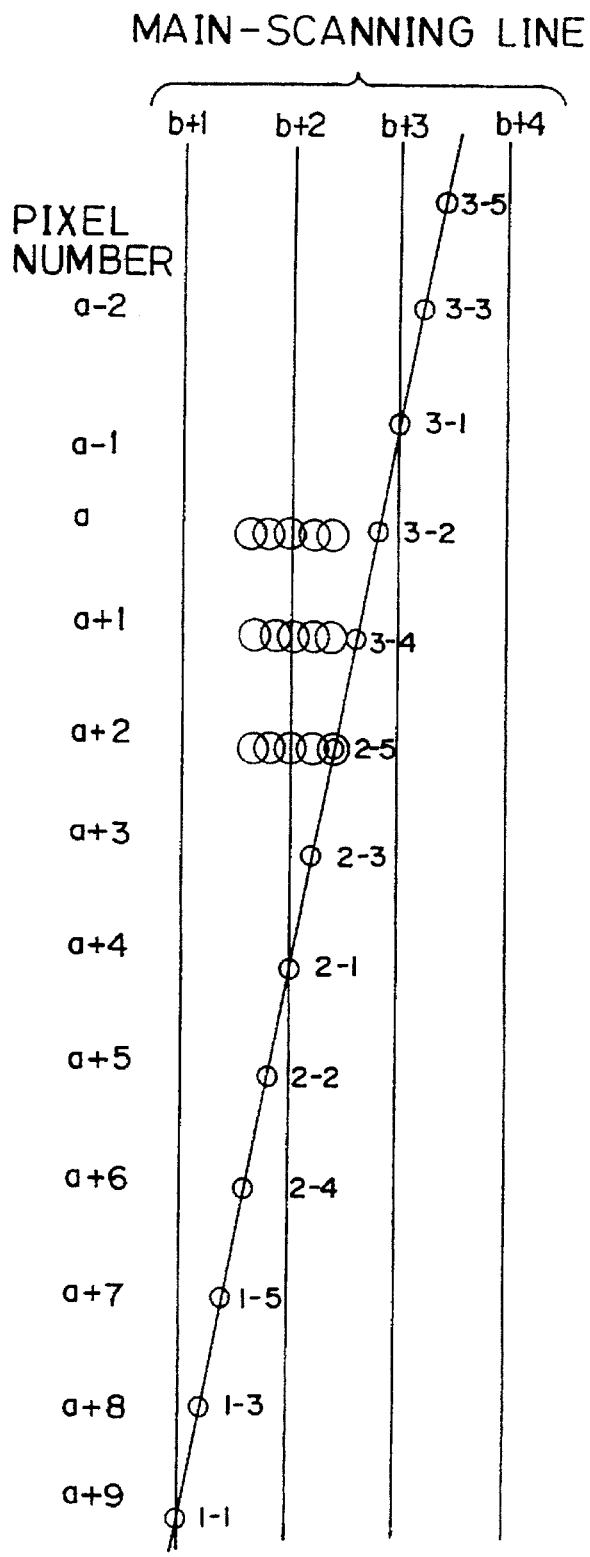

In this case, after executing the discharge sequence shown in FIGS. 5–10, finally, the maximum number (five) of ink droplets are discharged on the locations corresponding to the pixel numbers a, a+1, and a+2 as shown in FIG. 11. In these figures, dots recorded on the paper are depicted much smaller than an actual size compared with the nozzle pitch for the purpose of making the drawings clearer.

When the above described ink discharging operation is performed throughout one main-scanning and then the recording head 101 is moved in the sub-scanning direction, recording images are spread in a direction perpendicular to the main-scanning direction and stripes between scanning lines at high density portions is also prevented from being generated.

In FIGS. 4A–4E, the landing positions are depicted as if they were aligned along the horizontal direction or the sub-scanning direction for the sake of explanation. As is well known, it is preferable to drive the recording head having a plurality of nozzles on a basis of time division. In this case, it is possible to also vertically broaden landing positions of ink droplets by shifting the timing for driving neighboring nozzles.

The pattern, in which a plurality of ink droplets are discharged in the vertical and horizontal directions to form one pixel, is not limited to the embodiment shown in FIGS. 4A–4E. For example, when two ink droplets are discharged for one pixel, two nozzles of either side out of M nozzles relating to the pixel (5 nozzles in this embodiment) can be controlled to discharge ink droplets.

Furthermore, taking account of the time division drive in designing the system, it is possible to slightly change the nozzle pitch from that of the embodiment and then to change an angle between the nozzle line and the main-scanning line.

According to the study of the inventors of the present invention, the ability of human vision to discriminate image density generally depends on an interval of gradation in color and resolution of an image. In the case where pixels forming an image are sufficiently small, the discrimination ability becomes maximum when the interval of gradation in color is on the order of a few millimeters, and a less or larger interval than that reduces the discrimination ability.

In particular, when the interval of gradation in color due to the unevenness of an image is less than 0.5 mm, the discrimination ability sharply reduces; 4–5% unevenness of density is discriminated when the interval is 0.5 mm; and more than about 10% unevenness is discriminated when the interval is 0.3 mm; but the unevenness is hardly discriminated regardless of its level when the interval is less than 0.2 mm. In contrast, when the interval is 1 mm, less than 2% unevenness can be discriminated.

Generally speaking, even though the limit of the discrimination varies from person to person, the limit of the interval has little differences among persons.

When the pixels constituting an image are coarse (the resolution is low), the small unevenness of density cannot be discriminated. When the interval of the unevenness of density is equal to or less than five pixels, there is no trouble about the difference of the density because the coarseness of pixels hides the unevenness of density.

When the interval of the unevenness of density is about eight pixels, approximately 10% unevenness of density is discriminable. On the other hand, when the interval is no less than ten pixels, the unevenness less than 5% is discriminable. Almost the same tendency as that is shown in a coarse image of less than about 16 pixels per 1 mm width. For example, in a very coarse image on the order of two pixels per 1 mm width, the unevenness of density of small intervals cannot be discriminated, even though the coarseness of the image is conspicuous when seen from a much nearer viewpoint. However, as a matter of fact, such images are seen at a distance away from the distinct vision. Accordingly, the shortest image-visible distance depends on the coarseness of pixels. As a result, the discrimination limit of the unevenness of density is determined by the number of pixels of an image.

In view of these facts in this embodiment, even if the unevenness due to the difference in discharge characteristics of each nozzle becomes some percent, no problem occurs with regard to an image under the condition that A×L is set to a value equal to or less than 0.5 mm, or L is set to a value equal to or less than eight, where A is a pitch of scanning lines and L is the number of the scanning lines recorded in one main-scanning, that is, the number of pixels in the sub-scanning direction.

In particular, in this embodiment, since each pixel is recorded by using a plurality of nozzles (five nozzles), a beautiful image is obtained even if the difference in size of ink droplets discharged from each nozzle reaches about 10%.

Furthermore, when the value A×L is set to a value equal to or less than 0.3 mm, or the value L is set to a value equal to or less than 5, unevenness of an image due to slight variations in discharge characteristics of each nozzle becomes hardly discriminable, and hence, a very beautiful image is obtained regardless of the variation in recording heads.

In this embodiment, presence or absence of ink discharge, f(k, n), may be given in the following table corresponding to the halftone level of each pixel:

TABLE f(k, n) = 1: discharge f(k, n) = 0: non-discharge

|  |  | the nth ink droplet | | | | |
|---|---|---|---|---|---|---|
|  |  | n = 1, | 2, | 3, | 4, | 5 |
| k = |  0 | 0 | 0 | 0 | 0 | 0 |
| tone | 1 | 1 | 0 | 0 | 0 | 0 |
| wedge | 2 | 0 | 1 | 1 | 0 | 0 |
| level | 3 | 1 | 0 | 0 | 1 | 1 |
|  | 4 | 0 | 1 | 1 | 1 | 1 |
|  | 5 | 1 | 1 | 1 | 1 | 1 |
| $\sum_{k=0}^{K} f(k,n)$ | | 3 | 3 | 3 | 3 | 3 |

In the above table, 'k' means a halftone level (k=0, 1, . . . , K; K=M in this embodiment), and 'n' means the nozzle number (X–n) (n=1, 2, . . . , M; M=5 in this embodiment). f(k,n)=1 means that a nozzle of nozzle number n discharges ink at halftone level k, while f(k,n)=0 means that the nozzle does not discharge ink at halftone level k.

Each nozzle driving is averaged by defining presence or absence of ink discharge as described above. Moreover, dots for each pixel are near the center of each pixel and good sharpness of a recording image can be maintained.

In general, it is assumed that a halftone image is recorded by landing 0–K ink droplets on a recording medium from a plurality of ink droplets and that presence or absence of ink droplets necessary for forming a halftone level k for each pixel (0≦k≦K) is determined. When the 'n'th ink droplet (n=1–M) is discharged, the following equation is satisfied:

$f(k, n)=1$

When the 'n'th ink droplet is not discharged, the following equation is satisfied:

$f(k, n)=0$

With respect to the above n (n=1–M), whether each ink nozzle is used or not is determined so that the following expression is satisfied:

$$\sum_{k=0}^{K} f(k,n) \leq M - 1$$

Moreover, it is preferable to determine f(k, n) so that the following expression is satisfied:

$$\sum_{k=0}^{K} f(k,n) \leq (M/2) + 1$$

Since f(k, n) is defined as described above, use frequency of each nozzle is uniformed and no problem occurs due to excessive use of a particular nozzle.

According to the above rule, when evenness images are recorded at a high speed by using a recording head having a plurality of ink nozzles, use frequency of each nozzle is averaged. As a result, the recording head life can be prevented from being decreased due to excessive use of a particular nozzle.

Moreover, since a change in a halftone level of a recording image due to excessive use of a nozzle, and a change in a halftone level of a recording image and unevenness of image density due to non-uniform temperature rise of a recording head can be prevented, a stable and good recording image is obtainable.

(Embodiment 2)

Figure 12:
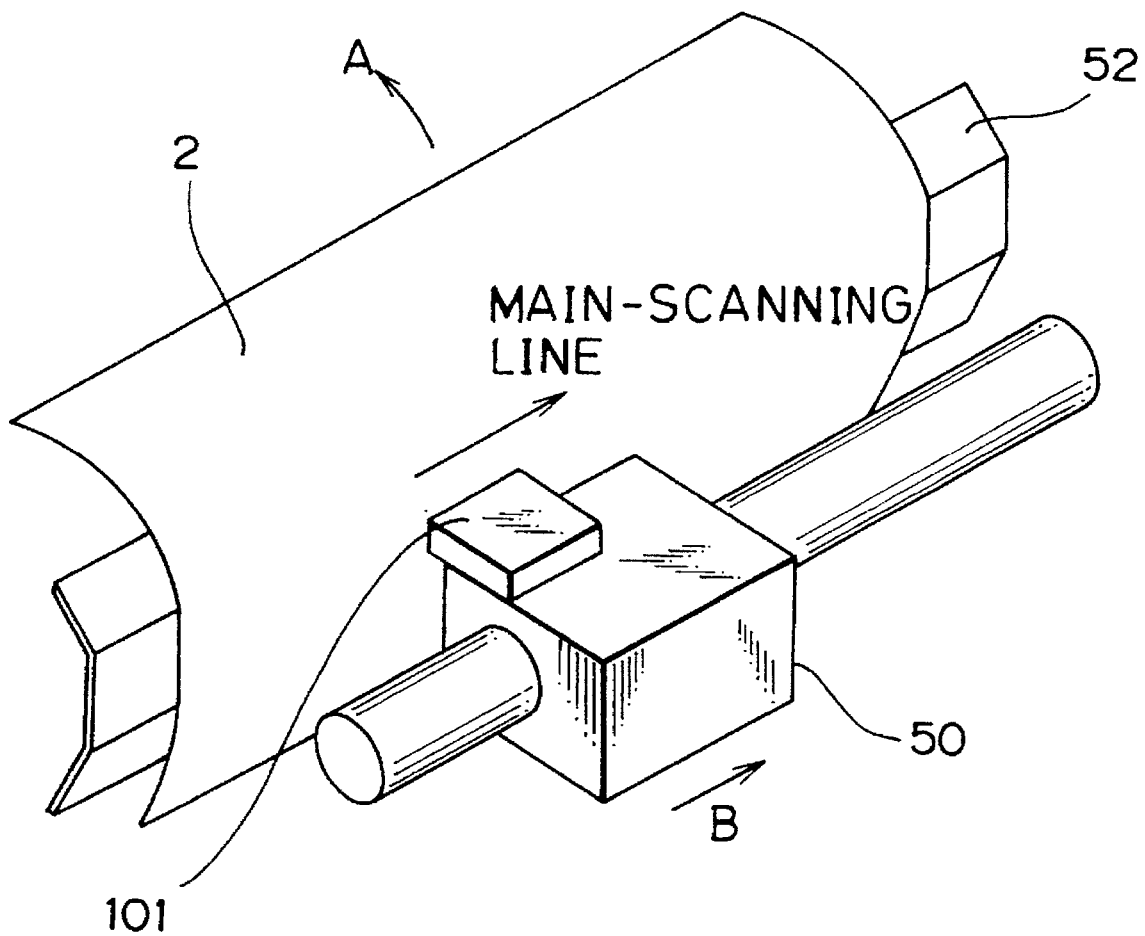
FIG. 12 is a view showing an appearance of another embodiment of an ink-jet recording apparatus.

FIG. 12 shows a second embodiment to which the recording method of the present invention is applied. In this embodiment, a recording head 101 is disposed on a carriage 50, and performs recording in synchronization with the movement of the carriage 50.

L scanning lines are recorded by one movement of the carriage 50, and then paper 2 is moved in the direction of the arrow A.

The recording method of this embodiment is the same as that of the first embodiment. Consequently, the recording head is disposed in such a manner that the direction of its nozzle line becomes approximately horizontal.

In the apparatus of the first embodiment, when a recording head including a large number of nozzles is used, the separation between the recording paper 2 and the tip of the nozzle at each end of the head must be widened since the paper 2 is wound on a drum 4. Thus, the size of a recording head to be used in the first embodiment is limited to a rather small one. To the contrary, the apparatus of the second embodiment has a flat platen 52, and hence, it has such an advantage over the apparatus of the first embodiment that it can employ a large recording head including the considerably large number of nozzles.

The apparatus of the first embodiment rotates the drum, and hence, it is easier for the first embodiment to speed up the relative velocity between the recording paper and the recording head than for the second embodiment that moves the carriage. Thus, the first embodiment is suitable for a recording head that has rather the small number of nozzles and can be driven at a high speed.

(Embodiment 3)

A third embodiment employs an apparatus similar to that of the first or the second embodiment. In the third embodiment, ink droplets discharged from respective nozzles differ in volumes. This makes it possible to increase the number of tone wedges of the recording image without increasing the number of ink droplets which are discharged in the vertical and horizontal directions to form one pixel.

For example, when the nozzles 1-1, 2-1, 3-1 and 4-1 are made to discharge a volume of ink about twice as large as that of the other nozzles, seven tone wedges of a recording image can be obtained by a certain combination of the nozzles even though the same number of dots are discharged for each pixel.

Furthermore, when the liquid volumes discharged from 5 nozzles, are set to the discharged liquid volume ratios 1, 1/2, 1/4, 1/8 and 1/16, 32 tone wedges can be achieved.

For this purpose, the volumes of ink droplets discharged from the nozzles have only to be made to be different from one another. For example, in a system wherein an ink-jet recording head generates bubbles in ink by thermal energy so that ink is discharged by the bubbles to be generated, the volumes can be changed by altering both an area of a heat generating surface of a heater and an aperture area of an nozzle.

In general, if nozzles are designed to make the aperture area of the nozzle so that a discharged volume of an ink droplet is large, it is difficult to achieve high packing density of the nozzles in a recording head. As described above, since a plurality of ink droplets are discharged in the vertical and/or horizontal directions to form one pixel in the above embodiments, it is relatively easy to design an aperture area of a nozzle and to achieve high packing density of nozzles as compared with a conventional recording head where a plurality of ink droplets are not discharged in the vertical and horizontal directions to form one pixel.

Moreover, in the above described embodiments, since a nozzle for relatively a small ink droplet volume can be disposed adjacent to a nozzle for relatively a large ink droplet volume, higher packing density of nozzles can be easily obtained. Alternatively, as a method in which each nozzle differs in a volume of a discharged ink droplet, a method, in which while meniscuses of all the nozzles are vibrated by piezo-electric elements, drive timing for driving each nozzle is made to be different, is disclosed in Japanese Patent Application Laying Open No. 27548/1985.

As described above, according to the present invention, the recording head is disposed so that the nozzle line of the recording head is obliquely inclined from the scanning line and that one pixel is formed by a plurality of ink droplets discharged from different ink nozzles. Thus, a high halftone recording image without stripes due to fluctuation of a discharged ink volume or unevenness of image density, is obtainable. Moreover, since there is a large degree of freedom in designing an amount of a discharged ink volume, high packing density of ink nozzles can be easily achieved.

(Further Description)

The present invention achieves distinct effect when applied to a recording head or a recording apparatus which has means for generating thermal energy such as electrothermal transducers or laser light, and which causes changes in the ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the thermoelectric transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

The present invention can be also applied to a so-called full-line type recording head whose length equals the maximum length across a recording medium, such a recording head may consists of a plurality of recording heads combined together, or one integrally arranged recording head.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, as an output device of a facsimile apparatus having a transmission and receiving function, and as an output device of an optical disc apparatus for recording and/or reproducing information into and/or from an optical disc. These apparatus requires means for outputting processed information in the form of hard copy.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet recording apparatus which records a halftone recording image by depositing more than one ink droplet on one pixel, comprising:

a recording head having a plurality of discharging portions, said plurality being of a number N, said discharging portions being arranged in an arrangement direction;

inputting means for inputting recording signals including a halftone data for each of a plurality of pixels; and scanning means for scanning said recording head and a recording medium relative to each other in a scanning direction which differs from both said arrangement direction of said discharging portions and a direction which is perpendicular to the arrangement direction, wherein said arrangement direction and the scanning direction are related such that said N discharging portions correspond to a plurality of scanning lines of a number L, L being less than N and a continuous group of said plural discharging portions, said group being of a number M, M being equal to N divided by L, generates one pixel; and control means for controlling driving of said recording head based on the inputted halftone data for each pixel so that a maximum number of ink droplets in accordance with the halftone data can be discharged on one pixel from said M said discharging portions in said scanning process, said number of ink droplets being not more than M.

2. An ink-jet recording apparatus which records a halftone recording image by depositing more than one ink droplet on one pixel, comprising:

a recording head having a plurality of discharging portions, said plurality being of a number N, said discharging portions being arranged in an arrangement direction;

inputting means for inputting recording signals including a halftone data for each of a plurality of pixels; and scanning means for scanning said recording head and a recording medium relative to each other in a scanning direction which differs from both said arrangement direction of said discharging portions and a direction which is perpendicular to the arrangement direction, wherein said arrangement direction and the scanning direction are related such that said N discharging portions correspond to a plurality of scanning lines of a number L, L being less than N and a continuous group of said plural discharging portions, said group being of a number M, M being equal to N divided by L, generates one pixel; and control means for controlling driving of said recording head based on the inputted halftone data for each pixel so that a maximum number of ink droplets in accordance with the halftone data can be discharged on one pixel from said M said discharging portions in said scanning process, said number of ink droplets being not more than M, wherein when a pitch of neighboring said scanning lines is A, a value of A×L is not more than 0.5 mm or L is not more than 8.

3. An ink-jet recording apparatus as claimed in claim 1, wherein when an angle between the arrangement direction of said line of discharging portions and the scanning direction is $\theta$, and tan $\theta$ is about 1/M.

4. An ink-jet recording apparatus as claimed in claim 1, wherein said control means controls a drive timing of said recording head so that said one pixel is formed by a line of ink droplets, said droplets being of a number not more than M, in a direction perpendicular to said scanning direction.

5. An ink-jet recording apparatus as claimed in claim 1, wherein said recording head further comprises a plurality of heating elements each of which produces thermal energy for discharging ink in response to an electric current.

6. An ink-jet recording method in which a halftone recording image is recorded by depositing more than one ink droplet for one pixel by using an ink-jet recording head having a plurality of ink discharging portions, said plurality being of a number N, said discharging portions being arranged in an arrangement direction, comprising the steps of:

inputting recording signals including a halftone data for each of a plurality of pixels;

scanning relatively said recording head and a recording medium in a scanning direction which differs from both said arrangement direction of said discharging portions and a direction which is perpendicular to the arrangement direction, said arrangement direction and the scanning direction being related so that said N discharging portions correspond to a plurality of scanning lines of a number L, L being less than N and each pixel is formed by a continuous group of said plural discharging portions, said group being of a number M, M being equal to N divided by L; and controlling said ink-jet recording head at said scanning step based on the inputted halftone data for each pixel so that a maximum number of ink droplets in accordance with the halftone data can be discharged for one pixel from said M said discharging portions, said number of ink droplets being not more than M.

7. An ink-jet recording method in which a halftone recording image is recorded by depositing more than one ink droplet for one pixel by using an ink-jet recording head having a plurality of ink discharging portions, said plurality being of a number N, said discharging portions being arranged in an arrangement direction, comprising the steps of:

inputting recording signals including a halftone data for each of a plurality of pixels;

scanning relatively said recording head and a recording medium in a scanning direction which differs from both said arrangement direction of said discharging portions and a direction which is perpendicular to the arrangement direction, said arrangement direction and the scanning direction being related so that said N discharging portions correspond to a plurality of scanning lines of a number L, L being less than N and each pixel is formed by a continuous group of said plural discharging portions, said group being of a number M, M being equal to N divided by L; and controlling said ink-jet recording head at said scanning step based on the inputted halftone data for each pixel so that a maximum number of ink droplets in accordance with the halftone data can be discharged for one pixel from said M said discharging portions, said number of ink droplets being not more than M, wherein when a pitch of neighboring said scanning lines is A, a value of A×L is not more than 0.5 mm or L is not more than 8.

8. An ink-jet recording method as claimed in claim 6, wherein an angle between the arrangement direction of said line of discharging portions and the scanning direction is θ, and tan θ is about 1/M.

9. An ink-jet recording method as claimed in claim 6, wherein said control step comprises a control step for controlling a drive timing of said recording head so that said one pixel is formed by a line of ink droplets, said droplets being of a number not more than M, in a direction perpendicular to the scanning direction.

10. An ink-jet recording method as claimed in claim 6, wherein said recording head further comprises a plurality of heating elements each of which produces thermal energy for discharging ink in response to an electric current.

11. An ink jet recording method in which a halftone recording image is recorded by depositing more than one ink droplet for one pixel by using an ink-jet recording head having a plurality of ink discharging portions, said plurality being of a number N, said discharging portions being arranged in an arrangement direction, comprising the steps of:

inputting recording signals including a halftone data for each of a plurality of pixels;

scanning relatively said recording head and a recording medium in a scanning direction which differs from both said arrangement direction of said discharging portions and a direction which is perpendicular to the arrangement direction, said arrangement direction and the scanning direction being related so that said N discharging portions correspond to a plurality of scanning lines of a number L, L being less than N and each pixel is formed by a continuous group of said plural discharging portions, said group being of a number M, M being equal to N divided by L;

controlling said ink-jet recording head at said scanning step based on the inputted halftone data for each pixel so that a maximum number of ink droplets in accordance with the halftone data can be discharged for one pixel from said M said discharging portions, said number of ink droplets being not more than M;

determining a rule governing whether each said discharging portion of said M discharging portions is used or not for each halftone level;

depositing a maximum of K ink droplets for one pixel; and making uniform a frequency of use for each said discharging portion to represent the K+1 halftone levels.

12. An ink-jet recording method in which a halftone recording image is recorded by depositing more than one ink droplet for one pixel by using an ink-jet recording head having a plurality of ink discharging portions, said plurality being of a number N, said discharging portions being arranged in an arrangement direction, comprising the steps of:

inputting recording signals including a halftone data for each of a plurality of pixels;

scanning relatively said recording head and a recording medium in a scanning direction which differs from both said arrangement direction of said discharging portions and a direction which is perpendicular to the arrangement direction, said arrangement direction and the scanning direction being related so that said N discharging portions correspond to a plurality of scanning lines of a number L, L being less than N and each pixel is formed by a continuous group of said plural discharging portions, said group being of a number M, M being equal to N divided by L;

controlling said ink-jet recording head at said scanning step based on the inputted halftone data for each pixel so that a maximum number of ink droplets in accordance with the halftone data can be discharged for one pixel from said M said discharging portions, said number of ink droplets being not more than M;

determining a rule governing whether each said discharging portion of said M discharging portions is used or not for each halftone level;

depositing a maximum of K ink droplets for one pixel, wherein K=M; and making uniform a frequency of use for each said discharging portion to represent the K+1 halftone levels.

\* \* \* \* \*

UNITED STATES PATENT AND TRADEMARK OFFICE
CERTIFICATE OF CORRECTION

PATENT NO. : 5,650,803

DATED : July 22, 1997

INVENTOR(S): YASUYUKI TAMURA ET AL.

It is certified that error appears in the above-identified patent and that said Letters Patent is hereby corrected as shown below:

COLUMN 3

Line 25, "to" should be deleted.
    Line 35, "are" should be --is--.
    Line 44, "is the" should read --the--.

COLUMN 4

Line 38, "mains-canning" should read --main-scanning--.

COLUMN 5

Line 19, "mains-canning" should read --main-scanning--.

COLUMN 6

Line 16, "is" should read --are--.

UNITED STATES PATENT AND TRADEMARK OFFICE
CERTIFICATE OF CORRECTION

PATENT NO. : 5,650,803

DATED : July 22, 1997

INVENTOR(S) : YASUYUKI TAMURA ET AL.

It is certified that error appears in the above-identified patent and that said Letters Patent is hereby corrected as shown below:

<u>COLUMN 11</u>

Line 42, "requires" should read --require--.

Signed and Sealed this

Thirty-first Day of March, 1998

Attest:

BRUCE LEHMAN

Attesting Officer     Commissioner of Patents and Trademarks